United States Patent
Sterkenburg (10) Patent No.: US 10,442,737 B2
(45) Date of Patent: Oct. 15, 2019

(54) CUTTING INSERTS WITH CROSS-HOLES AND GREEN BODIES AND METHODS FOR MAKING SUCH CUTTING INSERTS AND GREEN BODIES

(71) Applicant: SECO TOOLS AB, Fagersta (SE)

(72) Inventor: Dirk Sterkenburg, Gustafs (SE)

(73) Assignee: SECO TOOLS AB, Fagersta (SE)

( * ) Notice: Subject to any disclaimer, the term of this patent is extended or adjusted under 35 U.S.C. 154(b) by 450 days.

(21) Appl. No.: 15/105,902

(22) PCT Filed: Dec. 8, 2014

(86) PCT No.: PCT/EP2014/076926
§ 371 (c)(1),
(2) Date: Jun. 17, 2016

(87) PCT Pub. No.: WO2015/091073
PCT Pub. Date: Jun. 25, 2015

(65) Prior Publication Data
US 2016/0318812 A1 Nov. 3, 2016

(30) Foreign Application Priority Data
Dec. 20, 2013 (EP) .................................. 13198902

(51) Int. Cl.
*B32B 3/24* (2006.01)
*C04B 35/56* (2006.01)
(Continued)

(52) U.S. Cl.
CPC ............ *C04B 35/5626* (2013.01); *B22F 5/10* (2013.01); *B28B 3/086* (2013.01); *B30B 11/007* (2013.01); *B30B 15/02* (2013.01); *B30B 15/065* (2013.01); *C04B 35/64* (2013.01); *B22F 2003/033* (2013.01); *B22F 2005/001* (2013.01);
(Continued)

(58) Field of Classification Search
CPC ....... B23C 2200/361; B23B 2200/3618; B22F 5/10; B32B 3/266; Y10T 428/24298
See application file for complete search history.

(56) References Cited

U.S. PATENT DOCUMENTS 6,986,866 B2 * 1/2006 Gubanich ................. B22F 3/03
419/38
2004/0086415 A1 5/2004 Gubanich et al.
(Continued)

FOREIGN PATENT DOCUMENTS

EP 0599393 A1 6/1994
JP H10296499 A 11/1998

*Primary Examiner* — William P Watkins, III
(74) *Attorney, Agent, or Firm* — Corinne R. Gorski (57) ABSTRACT

A green body for a cross-hole, compacted cutting insert, as well as a cutting insert, equipment for making a green body, and method for making a green body, wherein the green body includes a first side, a second side, and a side surface extending between the first side and the second side entirely around the first side and the second side. The green body includes a quadrilateral-shaped cross-hole extending through the green body from a first location on the side surface to a second location on the side surface on an opposite side of the green body from the first location. The quadrilateral-shape of the cross-hole can assist in achieving a more uniform density of compactable material in the green body.

13 Claims, 6 Drawing Sheets

(51) Int. Cl.
*B22F 5/10* (2006.01)
*B30B 11/00* (2006.01)
*B30B 15/02* (2006.01)
*B30B 15/06* (2006.01)
*B28B 3/08* (2006.01)
*C04B 35/64* (2006.01)
*B32B 3/26* (2006.01)
*B22F 3/03* (2006.01)
*B22F 5/00* (2006.01)

(52) U.S. Cl.
CPC . *B23B 2200/3618* (2013.01); *B23C 2200/361* (2013.01); *B32B 3/266* (2013.01); *Y10T 428/24298* (2015.01)

(56) References Cited

U.S. PATENT DOCUMENTS

| | | | |
|---|---|---|---|
| 2006/0165828 A1* | 7/2006 | Smilovici | B22F 3/03 425/78 |
| 2011/0164934 A1 | 7/2011 | Cjem et al. | |
| 2012/0087746 A1 | 4/2012 | Fang et al. | |

* cited by examiner

PRIOR ART

FIG. 1A

PRIOR ART

FIG. 1B

PRIOR ART

CUTTING INSERTS WITH CROSS-HOLES AND GREEN BODIES AND METHODS FOR MAKING SUCH CUTTING INSERTS AND GREEN BODIES

RELATED APPLICATION DATA

This application is a § 317 National Stage Application of PCT International Application No. PCT/EP2014/076926 filed Dec. 8, 2014 claiming priority of EP Application No. 13198902.3, filed Dec. 20, 2013.

TECHNICAL FIELD

Aspects of the present invention relate to cross-hole, compacted cutting inserts, green bodies for such inserts, and equipment and methods for making such inserts.

BACKGROUND OF THE INVENTION

Figure 1A:
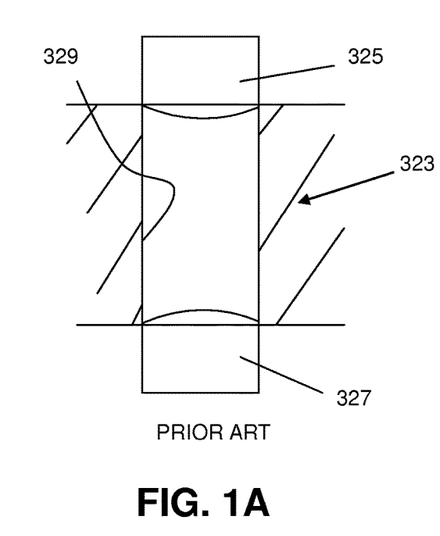
FIGS. 1A and 1B schematically show steps in a method for forming a green body having a density distribution as schematically shown in FIG. 1C.
Figure 1B:
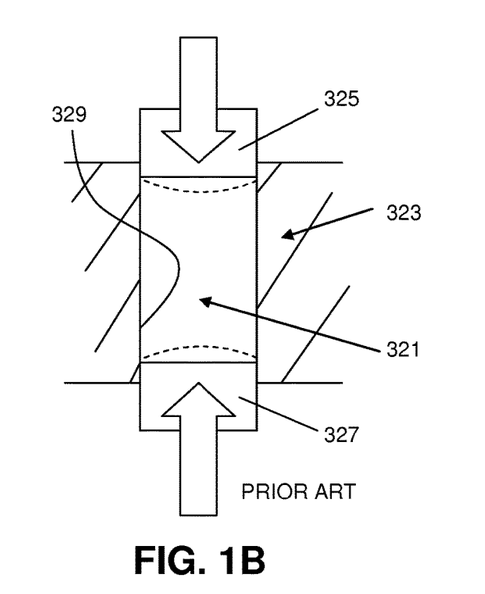
Figure 1C:
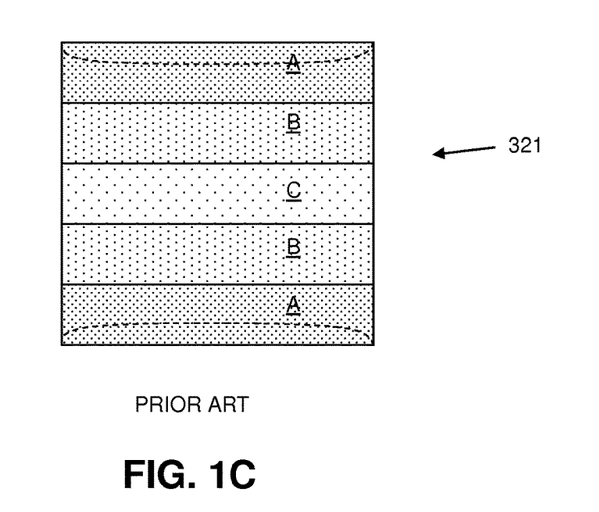

Conventional cutting inserts are typically formed by pressing a compactable material such as a tungsten carbide, or cermet, powder in a die to form a so-called "green body", and sintering the green body to form a blank, the blank being subject to different finishing operations, such as grinding and coating, to form the final cutting insert product. FIGS. 1A-1B schematically show steps in the formation of a green body 321 with a simple shape in a press tool comprising a die 323, and top and bottom punch components 325 and 327, the die having a die wall 329. As schematically shown in FIG. 1C, the resulting green body 321 will have a relatively high density in the top and bottom region A and B adjacent the one or more movable punch components 325 and 327 of the press tool, a relatively low density in the middle region C, and an intermediate density in regions D and E between the top and bottom region and the middle region. The difference in density is mainly caused by the friction between the compactable material and the die wall 329 during the compaction by the upper and lower punch 325 and 327.

Figure 2A:
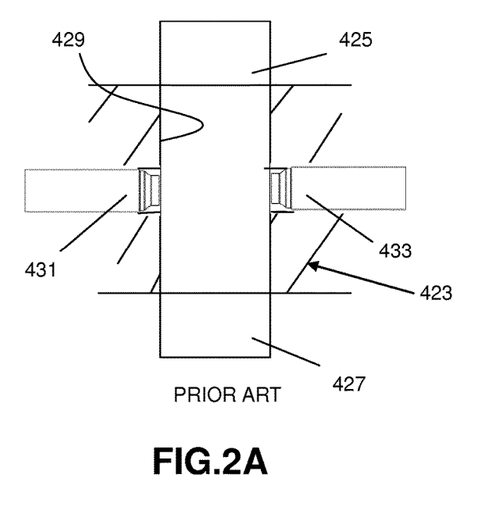
FIGS. 2A and 2B schematically show steps in a method for forming a green body having a density distribution as schematically shown in FIG. 2C.
Figure 2B:
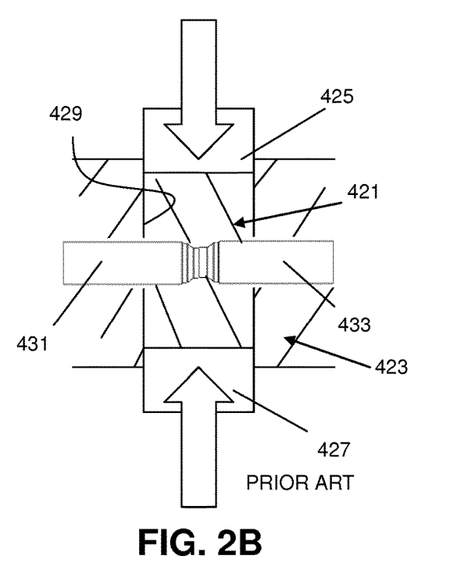
Figure 2C:
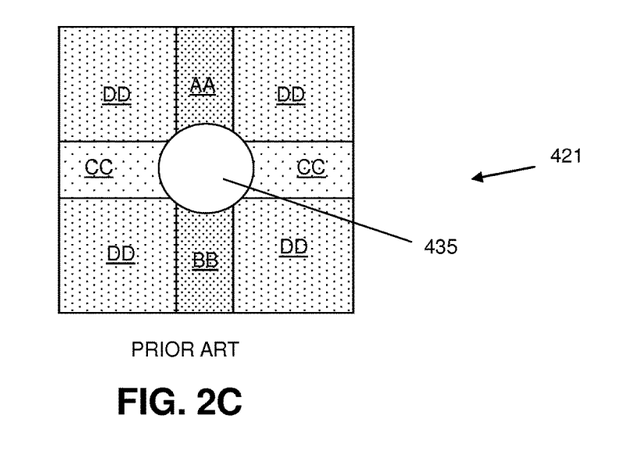
Figure 3:
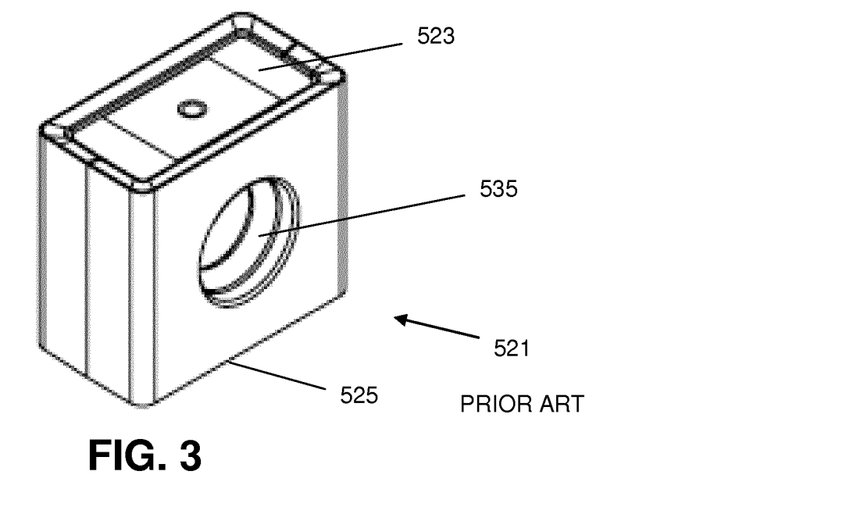
FIG. 3 is a perspective view of a conventional cross-hole compacted green body.
Figure 4A:
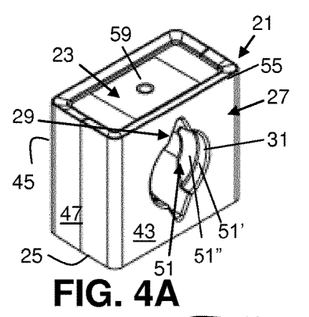
Figure 4B:
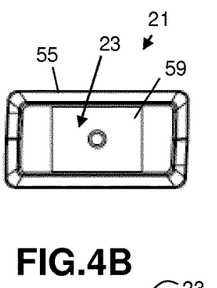
Figure 4C:
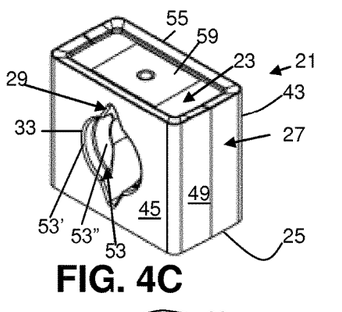
Figure 4D:
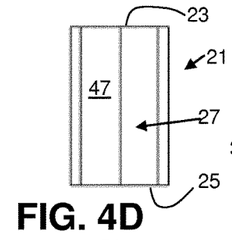
Figure 4E:
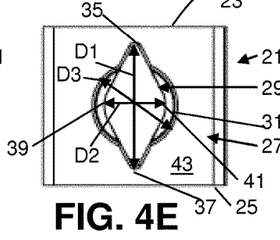
Figure 4F:
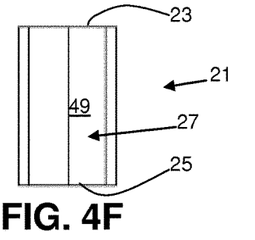
Figure 4G:
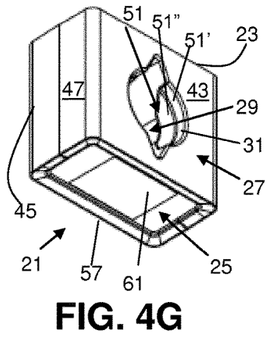
Figure 4H:
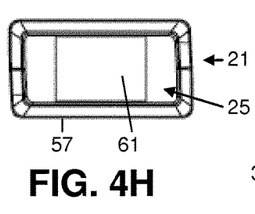
Figure 4I:
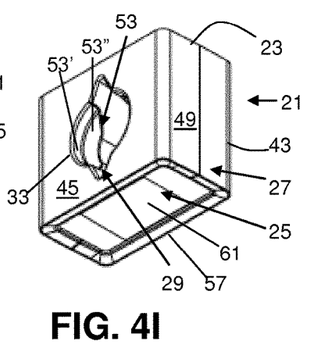
FIG. 4I is a rear, bottom perspective view of a green body according to an aspect of the present invention.
Figures 5A, 5C, 5D, 5F:
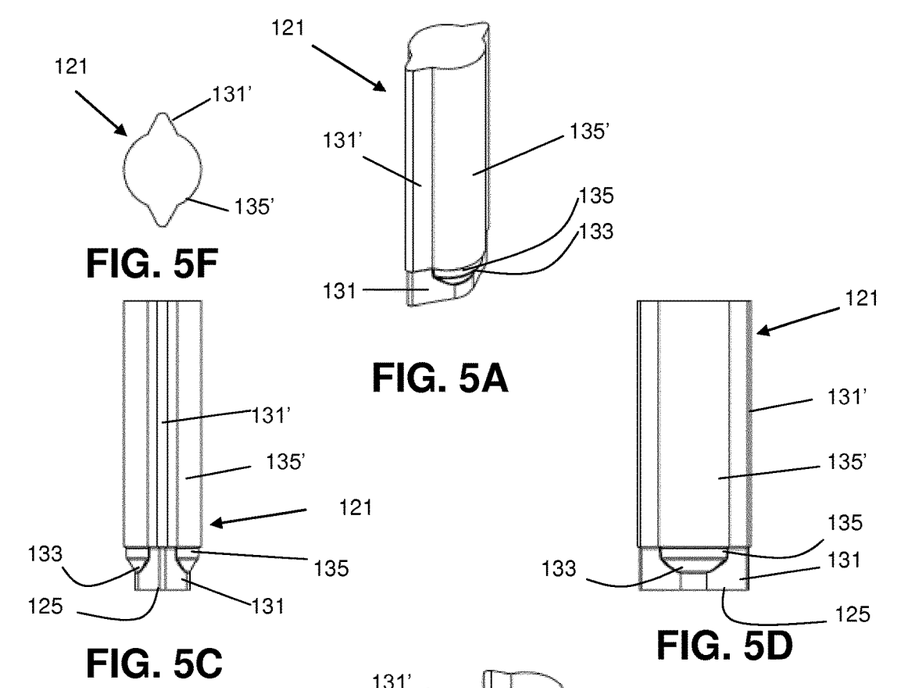
Figure 5B:
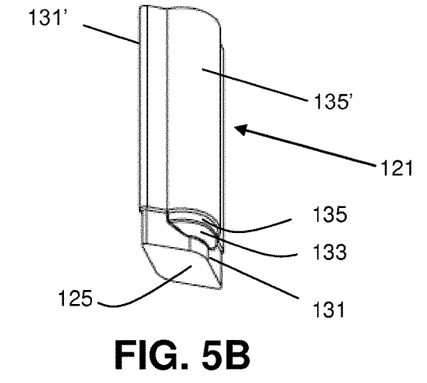
Figure 5E:
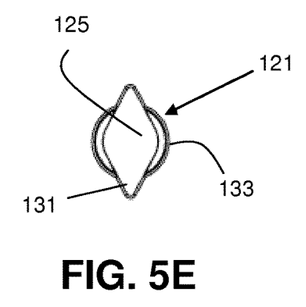

FIGS. 2A-2B schematically show steps in the formation of a green body 421 using a cross hole compaction process. In this process, the press tool has one or more movable punch components 425 and 427 and the die 423 has a die wall 429, and generally elliptical cross-hole pins 431 and 433 that are generally introduced into the die cavity before the material to be compacted is introduced, and the material is then compacted around the pins as the punch components move from the position shown in FIG. 2A to the position shown in FIG. 2B. The pins 431 and 433 are withdrawn and the resulting green body 421 is ejected from the die and will have a generally elliptical cross-hole 435 as schematically shown in FIG. 2C. The green body 421 will have a relatively high density in regions AA and BB above and below the cross hole 435, a relatively low density in regions CC to the left and right of the cross hole, and a medium density DD in the corner regions. The difference in density in a green body formed by the cross hole compaction process described with respect to FIGS. 2A-2C is mainly caused by the difference in compaction ratios due to the cross-hole pins. However, friction between the material being compacted and the die wall 429 during the compaction by the upper and lower punches 423 and 425 also contributes. The difference between the highest density and the lowest density in a green body with a circular or elliptical hole formed by the cross-hole compaction process described above is relatively high and can cause unwanted shape distortions during sintering of the green body, during which the green body shrinks. Due to shape distortions the sintered green body needs to be ground depending on final insert tolerances of the final product. FIG. 3 shows an illustrative green body 521 including a geometry formed in top and bottom sides 523 and 525 thereof that is the inverse of the shape of the one or more movable punch components (not shown) used to form the top and bottom surfaces. The green body 521 also includes a cross-hole 535 of the type that can be formed by elliptical pins as described in connection with FIGS. 2A-2B.

OBJECT OF THE INVENTION

It is desirable to provide a green body for a cross-hole compacted cutting insert that has a substantially uniform density or an improved density uniformity throughout the entire green body. It is also desirable to provide a cutting insert formed from such a green body. It is also desirable to provide a method for forming such a green body and such an insert.

SUMMARY OF THE INVENTION

According to an aspect of the present invention, a green body for a cross-hole, compacted cutting insert comprises a first side, a second side, and a side surface extending between the first side and the second side entirely around the first side and the second side, wherein the green body comprises a quadrilateral-shaped cross-hole extending through the green body from a first location on the side surface to a second location on the side surface on an opposite side of the green body from the first location, wherein the cross-hole has a quadrilateral shape with first and second points of the cross-hole closest to the first and second sides of the green body, respectively, and third and fourth points of the cross-hole between the first and second points, and a distance (D1) between the first and second points is greater than a distance (D2) between the third and fourth points.

According to one embodiment of the invention the side surface is a substantially cylindrical surface.

According to one embodiment of the invention the side surface has at least two, opposing, portions, and in that the first location and the second location are disposed on the two portions.

According to one embodiment of the invention the first side and the second side are non-planar.

According to one embodiment of the invention the peripheral edges of the first side and the second side intersect with the side surface and define an edge.

According to one embodiment of the invention a density of the green body is substantially uniform between the first side and the second side.

According to one embodiment of the invention wherein the cross-hole has a quadrilateral shape with first and second points of the cross-hole closest to the first and second sides of the green body, respectively, and third and fourth points of the cross-hole between the first and second points, wherein a density of the green body adjacent the third and fourth points of the cross-hole is substantially equal to a density of the green body adjacent the first and second sides.

According to one embodiment of the invention the third and fourth points of the cross-hole are disposed mid-way between the first and second sides of the green body.

According to one embodiment of the invention the first and second points of the cross-hole are disposed at equal distances from the first and second sides, respectively.

According to one embodiment of the invention the cross-hole comprises generally circular countersunk portions centered at the first location and the second location.

According to one embodiment of the invention the circular countersunk portions each includes a substantially cylindrical portion extending to the side surface and an inner portion that defines a non-zero angle with the substantially cylindrical portion and with the side surface adjacent the cross-hole.

According to another aspect of the present invention, a cutting insert made from the green body for a cross-hole compacted cutting insert according to any of the above embodiments of the invention is provided.

According to yet another aspect of the present invention, a method for making a cutting insert comprises positioning two opposing quadrilateral shaped cross-hole pins in a die so that ends of the pins contact each other, introducing material for forming a green body of the cutting insert into the die in which the two opposing pins are disposed, and compressing the material between first and second punches and around the pins to form a green body, the green body comprising a first side, a second side, a side surface extending between the first side and the second sides entirely around the first side and the second side, and a quadrilateral-shaped cross-hole defined by the pins and extending through the green body from a first location on the side surface to a second location on the side surface on an opposite side of the green body from the first location. The quadrilateral-shaped cross-hole (29) has first and second points (35 and 37) of the cross-hole (29) closest to the first and second sides (23 and 25) of the green body (21), respectively, and third and fourth points (39 and 41) of the cross-hole (29) between the first and second points (35 and 37).

BRIEF DESCRIPTION OF THE DRAWINGS

The features and advantages of the present invention are well understood by reading the following detailed description in conjunction with the drawings in which like numerals indicate similar elements and in which:

FIG. 4A is a front, top perspective view, FIG. 4B is a top view, FIG. 4C is a rear, top perspective, FIG. 4D is a right side view, FIG. 4E is a front side view, FIG. 4F is a left side view, FIG. 4G is a front, bottom perspective view, FIG. 4H is a bottom view.

FIG. 5A is a top perspective view, FIG. 5B is a bottom perspective view, FIG. 5C is a top or bottom side view, FIG. 5D is a left or right side view, FIG. 5E is a front end view, and FIG. 5F is a rear end view of a quadrilateral-shaped, cross-hole pin according to an aspect of the present invention;

DETAILED DESCRIPTION

FIGS. 4A-4I show a green body 21 for a cross-hole, compacted cutting insert according to an aspect of the present invention. The particular green body 21 illustrated will form a double-sided cutting insert, meaning the presence of chip breaker geometries on two sides of the cutting insert, and the present invention shall be primarily described in connection with such a double-sided green body/insert, however, it will be appreciated that the present invention is also applicable to single-sided, three-sided and four-sided inserts.

The green body 21 is typically formed from a compactable material such as tungsten carbide powder, or cermet powder, that is subsequently sintered to form a blank being subject to different finishing operations, such as grinding and coating, to form the cutting insert. During sintering, the green body shrinks to a smaller size and, if shrinkage is uniform, as is typically desired, the resulting blank will be the same shape as the green body, except smaller. It will thus be understood that the illustration of the green body 21 will also constitute an illustration of the cutting insert that results from the sintering of the green body and the finishing treatment of the blank after sintering.

The green body comprises a first side 23, a second side 25, and a side surface 27 extending between the first side and the second side entirely around the first side and the second side. The first and second sides 23 and 25 may be identical but need not be, and the side surface may be cylindrical or substantially cylindrical, but need not be. The green body 21 is illustrated as having a side surface 27 that is perpendicular to planes of the first side 23 and the second side 25, however, the green body may have planes of a first side 23 and a second side 25 that forms an angle, usually up to about +/−30 degrees, with planes of the side surface 27. It will be appreciated, of course, that the first and second sides will not necessarily be planar and may have a variety of shapes, including chipbreakers, such that a "plane" of the first and second sides may be an imaginary reference plane.

The green body 21 comprises a "quadrilateral-shaped" cross-hole 29 extending through the green body from a first location 31 on the side surface 27 to a second location 33 on the side surface on an opposite side of the green body from the first location. A "quadrilateral-shaped" cross-hole is defined as and intended to encompass a variety of similar cross-hole shapes adapted to facilitate an improved density distribution of compacted material in a green body and including cross-holes with shapes similar to quadrilaterals, cross-holes in the form of orthogonal quadrilaterals (e.g., squares), and non-orthogonal quadrilaterals (e.g., rhombuses, kites), although sides may be curved to the extent that the curvature does not interfere with the function of the quadrilateral shape as described herein, and corners need not be sharp and may be curved. In a presently preferred embodiment, the cross-hole will have a rhombus shape. The quadrilateral may have a major axis and a minor axis between most distant opposite corners and closes opposite corners, respectively. What shall be referred to here as the major axis will typically be parallel to an axis extending from the first side 23 to the second side 25 of the green body 21, and the minor axis will typically be within +/−30 degrees of perpendicular to the major axis. The major axis is considered to extend substantially in a direction of pressing of the insert (illustrated by arrows in FIG. 6B). The length of the minor axis will typically be from about 0.2× (times) the length of the major axis to about 2× the length of the major axis. While corners at the ends of the major and minor axes may have no radii, they will ordinarily have at least small radii. Radii of corners at the ends of the major axis will typically be smaller than radii of corners at the ends of the minor axis. By having no radii or small radii of corners at the ends of the major axis the mechanism causing build-up of the density above and below the cross hole pin upon compaction of the compactable material is believed to be deactivated, and thereby the variation in density in the green body is reduced. Of course, other radii can be selected, if desired.

Provision of the quadrilateral-shaped cross-hole 29 facilitates providing a green body with a substantially uniform density between the first side 23 and the second side 25 and over the height of the side surface 27. A uniform density distribution is desirable in green bodies to minimize shape distortions during sintering.

The cross-hole 29 has a quadrilateral shape with first and second points 35 and 37 (FIG. 4E) of the quadrilateral closest to the first and second sides 23 and 25 of the green body, respectively, and third and fourth points 39 and 41 (FIG. 4E) of the quadrilateral between the first and second points. A distance D1 (FIG. 4E) between the first and second points 35 and 37 is ordinarily greater than a distance D2 (FIG. 4E) between the third and fourth points 39 and 41. The side surface 27 ordinarily has at least two, opposing, portions 43 and 45 that may be flat or curved, and the first location 31 and the second location 33 are disposed on the two portions. The green body 21 shown in FIGS. 4A-4I includes two additional, minor flat or substantially flat portions 47 and 49 between the portions 43 and 45, however, it will be appreciated that any of the portions 43-49 may be curved, may comprise a series of angled surfaces, may have recesses and protrusions, and/or need not include any flat or planar portions.

In the quadrilateral-shaped cross-hole 29, the third and fourth points 39 and 41 of the quadrilateral are typically disposed mid-way between the first and second sides 23 and 25 of the green body 21. The first and second points 35 and 37 of the quadrilateral are typically disposed at equal distances from the first and second sides 23 and 25, respectively. In FIG. 4 radii of corners at the ends of the major axis, i.e. at the first and second points 35 and 37, are smaller than radii of corners at the ends of the minor axis. i.e. at third and fourth points 39 and 41. The cross-hole 29 can comprise generally circular countersunk portions 51 and 53 centered at the first location and the second location of the type that are typically used in conventional cutting inserts. The outer diameters D3 (FIG. 4E) of circles defined by the countersunk portions 51 and 53 are typically greater than the distance D2 between the third and fourth points 39 and 41 of the quadrilateral 29, but less than the distance D1 between the first and second points 35 and 37. As in conventional, elliptical or circular holes, the slightly elliptical or circular countersunk portions 51 and 53 can each include a substantially cylindrical portion 51' and 53' extending to the side surface 27 and an inner portion 51" and 53" that defines a non-zero angle with the substantially cylindrical portion and with the side surface adjacent the cross-hole. The angled inner portions 51" and 53" typically function as clamping surfaces for a head of a bolt or screw (not shown) that is used to clamp the insert formed from the green body 21 to a toolholder (not shown). It will be appreciated, however, that it is not necessary that the cross-hole 29 include countersunk portions or that the insert formed from the green body 21 be of the type that is clamped by means of a bolt or screw. The insert may be clamped by a clamping arm or wedge arrangement, for example, and the cross-hole 29 may not play any role in clamping of the insert. The cross-hole 29 may have the same shape through the entire thickness of the insert which, in addition to reducing density variations in the green body, can reduce the amount of material used to form the insert.

The first side 23 and the second side 25 are typically formed by compaction by, typically, first and second punches (e.g., 127 and 129 in FIGS. 6A-6B) and are typically non-planar and have shapes that are the inverse of non-planar surfaces of the first and second punches. Ordinarily, peripheral edges 55 and 57 of the first side 23 and the second side 25 intersect with the side surface 27 and define respective edges that form cutting edges after sintering of the green body. While the first and second sides 23 and 25 may be flat, typically, central regions 59 and 61 of the first and second sides disposed inward of the peripheral edges 55 and 57 have a specially shaped geometry such that overlying portions of the central regions are closer to each other (D4) than at least some overlying portions of the peripheral edges of the first and second sides (D5) as the result of compaction of the material forming the green body between the two opposing punches having appropriately shaped, inverse geometries (e.g., punches 127 and 129 in FIGS. 6A-6B). The expression "overlying portions" is intended to refer to portions of the green body at the first and second side and at the side surface adjacent the first and second side that are disposed vertically above one another in the view seen in FIG. 6B. It will be appreciated that the insert may be formed in other ways than described above, such as by pressing a compactable material in a die with one fixed surface opposing a movable punch.

Planes of the first side 23 and the second side 25 are illustrated as being substantially perpendicular to the side surface 27 and to the pressing direction of the punches 127 and 129 (illustrated by arrows in FIG. 6B), however, it will be appreciated that the planes of the first side and the second side may be inclined relative to the side surface and/or to the pressing direction of the punches.

A density of the green body 21 with the quadrilateral-shaped cross-hole is ordinarily substantially uniform between the first side and the second side. Substantially uniform is defined for purposes of the description of the density of the green body as merely meaning more uniform than will typically be achieved in an insert having a circular cross-hole.

While not wishing to be bound by theory, considering, first, only compaction caused by providing a quadrilateral-shaped cross-hole 29, as seen in FIGS. 4A-4I, assuming no friction between compactable material for forming the green body 21 and die tool parts, because more material has to be moved aside to form the cross-hole in the region adjacent the third and fourth points 39 and 41 of the quadrilateral and extending across the width of the green body, compaction of the material is maximum in that region and decreases in a direction toward the first and second points 35 and 37. This is illustrated in FIG. 7B by more closely spaced lines L (in a manner similar to the manner by which a contour map illustrates differing degrees of steepness) toward the third and fourth points 39 and 41. At the same time, in case of friction, compaction of the material for forming a green body by opposing punches results in an increased density of the material closest to the first and second sides 23 and 25 and decreasing toward the region mid-way between the first and second sides, illustrated in FIG. 7A by more closely spaced lines L closest to the first and second sides 23 and 25 (showing the prior art compaction gradient in a green body of the type shown in FIG. 1C that would have been formed by a press tool as shown in FIGS. 1A and 1B).

Figure 7A:
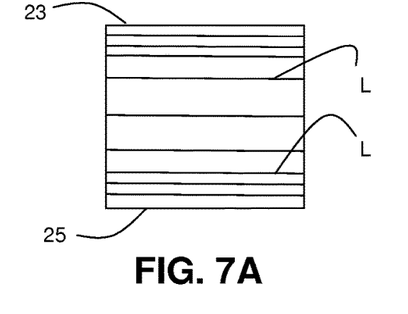
FIG. 7A shows a density distribution in a green body resulting only from compaction between two punches.
Figure 7B:
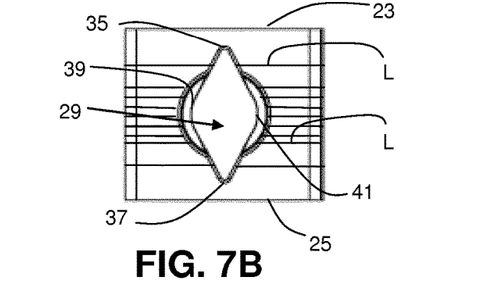
FIG. 7B shows a density distribution in a green body resulting only from frictionless compaction around a quadrilateral-shaped, cross-hole pin.

As a consequence of the differing compaction gradients or regions, the relatively increased compaction in the region mid-way between the first and second sides 23 and 25 resulting from frictionless formation of the cross-hole 29, as illustrated in FIG. 7B, is offset by the relatively decreased compaction in a mid-way region, as shown in FIG. 7A, resulting from forming the green body 21 by the opposing punches. Likewise, the relatively increased compaction of the green body 21 in the regions toward the first and second sides 23 and 25 as the result of forming the green body by the opposing punches is offset by the relatively decreased compaction of those regions resulting from frictionless formation of the quadrilateral-shaped cross-hole. Preferably, a density of the green body 21 adjacent the third and fourth points 39 and 41 of the quadrilateral is substantially equal to a density of the green body adjacent the first and second sides 23 and 25.

Following compaction of the green body 21, the green body is typically sintered to form a blank having the shape of the green body, albeit smaller because of shrinkage. Because the green body 21 can be formed to have a substantially uniform density, the green body is expected to shrink uniformly during sintering so that accuracy of the shape of the blank can be improved without the need for subsequent processing, or at least with the need for less subsequent processing than is typical in a similar blank having an elliptical or circular cross-hole.

Figure 6A:
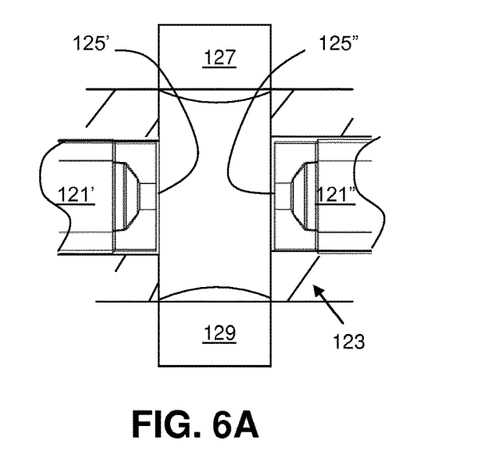
FIGS. 6A and 6B show steps in a method for forming a green body according to an aspect of the present invention.
Figure 6B:
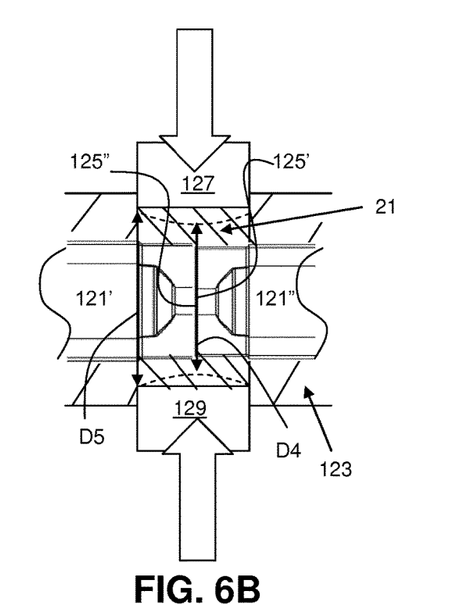

A method of making the green body 21 for forming the cutting insert is illustrated in FIGS. 6A-6B. In the method, two opposing quadrilateral shaped cross-hole pins 121' and 121" (a representative pin 121 is seen in greater detail in FIGS. 5A-5F) are positioned in a die 123 so that ends 125' and 125" of the pins contact each other. Material for forming a green body 21 of the cutting insert is introduced into the die in which the two opposing pins 121' and 121" are disposed. The material is compacted between first and second punches 127 and 129 and around the pins 121' and 121" to form a green body 21 as seen in FIGS. 4A-4I. The green body 21 comprises a first side 23, a second side 25, a side surface 27 extending between the first side and the second sides entirely around the first side and the second side, and a quadrilateral-shaped cross-hole 29 defined by the pins and extending through the green body from a first location 31 on the side surface to a second location 33 on the side surface on an opposite side of the green body from the first location.

The pin 121 shown in FIGS. 5A-5F will ordinarily be the same pin that is used for the pins 121' and 121" shown in FIGS. 6A-6B. The pin 121 includes a quadrilateral-shaped end 125 and a quadrilateral-shaped cylindrical portion 131 extending from the end to an angled portion 133 that has the inverse shape of the angled inner portion 51" and 53" of the cross-hole. The angled portion 133 transitions to a slightly elliptically or circularly cylindrical portion 135. The quadrilateral-shaped cylindrical portion 131 and the elliptically or circularly cylindrical portion 135 typically transition to a slightly larger quadrilateral-shaped cylindrical portion 131' and a slightly larger elliptically or circularly cylindrical portion 135' at a distance from the end 125 that is one half of the depth of the cross-hole 29 to be formed by the pin 121. The larger quadrilateral-shaped cylindrical portion 131' and larger elliptically or circularly cylindrical portion 135' are sized to minimize the possibility of compactable material for forming the green body being pressed between walls of the cylindrical hole in the die and the larger quadrilateral-shaped cylindrical portion and larger circularly cylindrical portion.

While not wishing to be bound by theory, by changing the geometry of the cross hole pin from a conventional slightly elliptical shape into such a quadrilateral shape, it is believed that the mechanism causing the build-up of the density above and below the cross hole pin upon compaction of the compactable material is deactivated. The final result is a green body with a substantially uniform density distribution.

FIG. 7A shows the typical density distribution that occurs as the result of compaction of the compactable material between opposing punches, similar to the distribution shown in FIG. 1C except, instead of showing the variation in compression as a series of regions of different compression, variation in compression is reflected by the closeness of horizontal lines L. FIG.

7B shows the density distribution of the green body as it is believed to result where a quadrilateral shaped cross hole pin is used, while assuming that no friction exists between the compactable material and the die walls and between the compactable material and the quadrilateral shaped cross hole pin. It is believed that a relatively low density exists in the top/bottom region, a relatively high density in the middle region, and a medium density in the region between the top/bottom region and the middle region.

In addition, FIG. 7B shows no build-up of density above the sharp tip of the quadrilateral shaped cross hole pin. It is believed that a sufficiently sharp tip will not be "flat" enough to stop the powder from flowing toward the left or right of the cross-hole pin. In case of no friction, the relative density at a specific point is directly proportionally to the space between the quadrilateral shaped cross hole pin and die wall at that specific point.

Figure 7C:
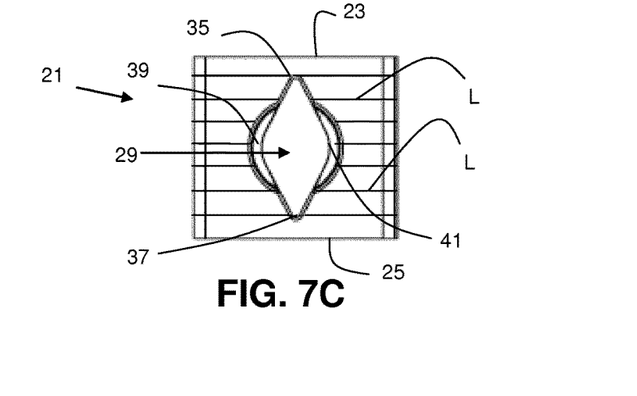
FIG. 7C shows a schematic density distribution in a green body according to an aspect of the present invention resulting from a combination of the characteristics of the density distributions of FIGS. 7A and 7B.

FIG. 7C shows the final density distribution of a green body with quadrilateral shaped cross hole that is the result of compaction between opposing punches as shown in FIG. 7A including friction, and frictionless compaction around a quadrilateral-shaped cross-hole pin. The density distribution is uniform because it is assumed that the friction effects on the density distribution of FIG. 7A are inversely proportional to the density distribution effects of the frictionless quadrilateral shape cross hole compaction as shown in FIG. 7B.

Thus, when compacting the material in the die, the material closest to the punches 127 and 129 at the first and second sides 23 and 25 of the green body 21 is compacted more by the punches and due to friction between the die walls and the compactable material than the material midway between the first and second sides as seen in FIG. 7A. However, the presence of the pins 121' and 121" results in compactable material flowing to the left and right of the first and second points 35 and 37 of the quadrilateral and, at a horizontally widest part of the quadrilateral-shaped cross-hole 29 (assuming the punches 127 and 129 are moving in a vertical direction) by the first and fourth points 39 and 41 of the quadrilateral, being compacted more than material at the horizontally narrowest part of the quadrilateral, i.e., by the first and second points 35 and 37, and more than material above and below the quadrilateral. Thus, compaction increases toward the vertical center of the green body as a result of compaction around the pins 121' and 121" while also increasing in a direction toward the first and second sides 23 and 25 of the green body away from the vertical center of the green body as a result of compaction by the first and second punches 127 and 129. These two offsetting compaction effects tend to reduce variation in density in the green body 21 between the first and second sides 23 and 25.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A green body for a cross-hole, compacted cutting insert, comprising:
   a first side;
   a second side;
   a side surface extending between the first side and the second side and entirely around the first side and the second side; and
   a quadrilateral-shaped cross-hole extending through the green body from a first location on the side surface to a second location on the side surface, the second location being on an opposite side of the green body from the first location, the quadrilateral-shaped cross-hole having first and second points closest to the first and second sides of the green body, respectively, and third and fourth points between the first and second points, wherein a first distance between the first and second points is greater than a second distance between the third and fourth points.

2. The green body for a cross-hole, compacted cutting insert as set forth in claim 1, wherein the side surface is a substantially cylindrical surface.

3. The green body for a cross-hole, compacted cutting insert as set forth in claim 1, wherein the side surface has at least two, opposing portions, the first location and the second location being disposed on the two portions.

4. The green body for a cross-hole, compacted cutting insert as set forth in claim 1, wherein the first side and the second side are non-planar.

5. The green body for a cross-hole, compacted cutting insert as set forth in claim 1, wherein peripheral edges of the first side and the second side intersect with the side surface and define an edge.

6. The green body for a cross-hole, compacted cutting insert as set forth in claim 1, wherein a density of the green body is substantially uniform between the first side and the second side.

7. The green body for a cross-hole, compacted cutting insert as set forth in claim 1, wherein a density of the green body adjacent the third and fourth points of the cross-hole is substantially equal to a density of the green body adjacent the first and second sides.

8. The green body for a cross-hole, compacted cutting insert as set forth in claim 1, wherein the third and fourth points of the cross-hole are disposed mid-way between the first and second sides of the green body.

9. The green body for a cross-hole, compacted cutting insert as set forth in claim 1, wherein the first and second points of the cross-hole are disposed at equal distances from the first and second sides, respectively.

10. The green body for a cross-hole, compacted cutting insert as set forth in claim 1, wherein the cross-hole includes generally circular countersunk portions centered at the first location and the second location.

11. The green body for a cross-hole, compacted cutting insert as set forth in claim 10, wherein the circular countersunk portions each includes a substantially cylindrical portion extending to the side surface and an inner portion that defines a non-zero angle with the substantially cylindrical portion and with the side surface adjacent the cross-hole.

12. A cutting insert made from the green body for a cross-hole compacted cutting insert as set forth in claim 1.

13. A method for making a cutting insert, comprising:
   positioning two opposing quadrilateral shaped compacting pins in a die so that ends of the pins contact each other;
   introducing material for forming a green body of the cutting insert into the die in which the two opposing pins are disposed; and
   compressing the material between first and second punches and around the pins to form a green body, the green body having a first side, a second side, a side surface extending between the first side and the second sides entirely around the first side and the second side, and a quadrilateral-shaped cross-hole defined by the pins and extending through the green body from a first location on the side surface to a second location on the side surface on an opposite side of the green body from the first location, the quadrilateral-shaped cross-hole having first and second points closest to the first and second sides of the green body, respectively, and third and fourth points between the first and second points, a first distance between the first and second points being greater than a second distance between the third and fourth points.

* * * * *